Nov. 25, 1924.
H. S. JANDUS
CLAMPING DEVICE FOR BUMPERS
Filed Feb. 28, 1923
1,516,731
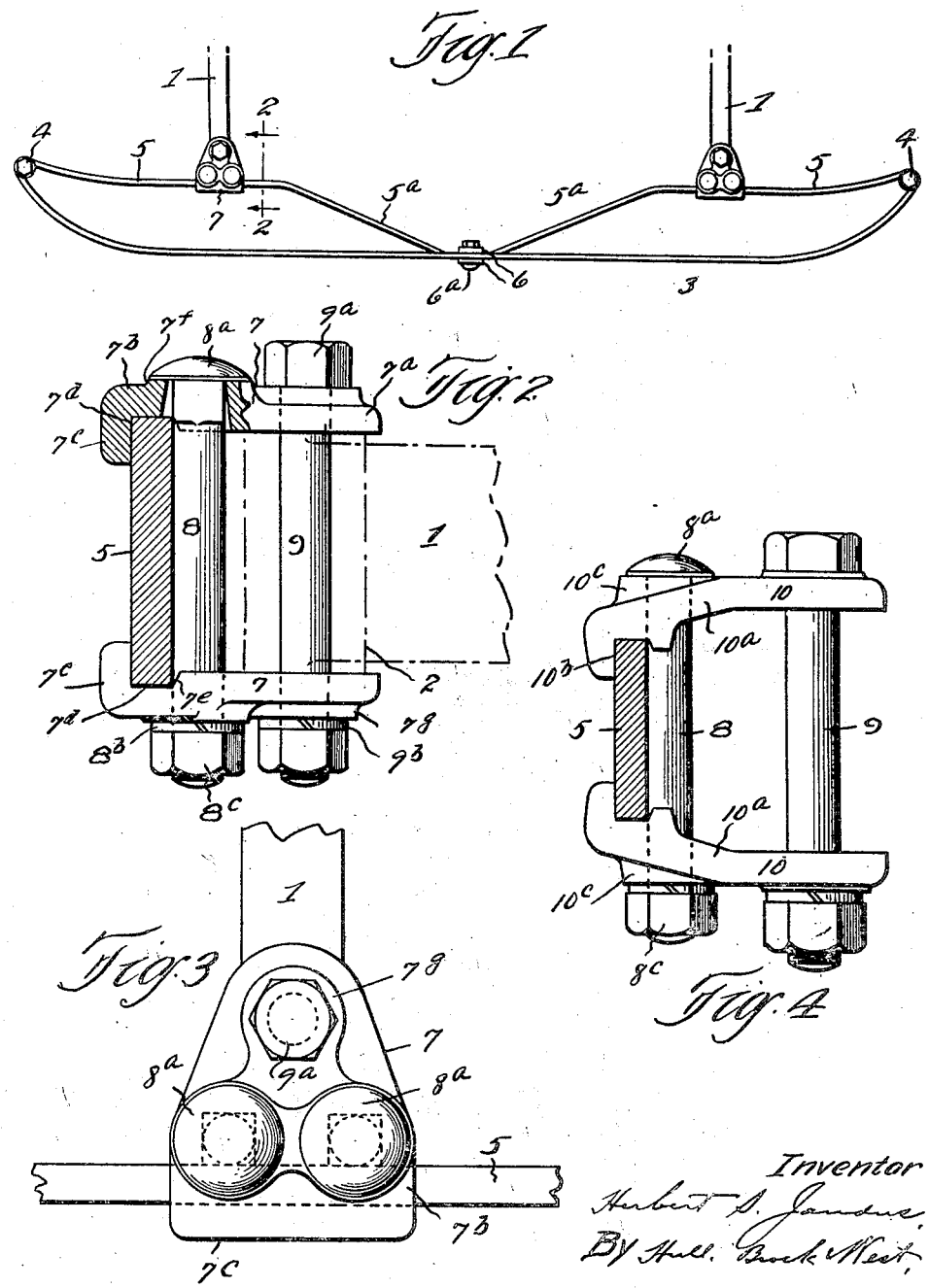

Patented Nov. 25, 1924.

1,516,731

UNITED STATES PATENT OFFICE.

HERBERT S. JANDUS, OF KALAMAZOO, MICHIGAN, ASSIGNOR TO THE C. G. SPRING & BUMPER COMPANY, OF DETROIT, MICHIGAN, A CORPORATION OF DELAWARE.

CLAMPING DEVICE FOR BUMPERS.

Application filed February 28, 1923. Serial No. 621,754.

*To all whom it may concern:*

Be it known that I, HERBERT S. JANDUS, a citizen of the United States, residing at Kalamazoo, in the county of Kalamazoo and State of Michigan, have invented a certain new and useful Improvement in Clamping Devices for Bumpers, of which the following is a full, clear, and exact description, reference being had to the accompanying drawings.

This invention relates to clamps for bumpers, and more particularly to clamps for pivotally connecting the bumpers to their supporting arms.

The general purpose and object of the invention is to provide a clamp of this character which may be readily applied to and which may remain firmly connected with the cooperating part of the bumper, as well as a clamp which is inexpensive of construction and capable of rapid production.

I accomplish the foregoing general objects in and through the construction and arrangement of parts shown in the drawings, wherein Fig. 1 represents a plan view of a bumper and the supporting arms therefor, the bumper being equipped with clamps embodying my invention; Fig. 2 is a sectional detail corresponding to the line 2—2 of Fig. 1, certain parts being broken away; Fig. 3 a detail in plan of the clamp and the parts with which it is associated; and Fig. 4 a detail in sectional elevation of a modification of the form of clamp in the preceding view.

Describing by reference characters the various parts illustrated herein, 1 denotes the supporting arms for the bumper, which arms may be secured to the side members of an automobile (not shown). Each of said arms is provided with an eye 2 at its front or outer end (as indicated in dot-and-dash lines in Fig. 2). Each of these arms is connected by my clamping means to a bumper, one form of such bumper being shown in Fig. 1. The bumper so shown is of the type disclosed in McGregor Patent No. 1,372,154, issued March 22, 1921, and comprises generally a pair of vertically spaced front or impact bars, the upper one of which is shown at 3, said bars being connected at their ends, by bolts 4, with a rear or auxiliary bar or plate, the said rear or auxilary bar or plate being shown as provided with portions 5 extending inwardly from the ends thereof, with forwardly or outwardly extending portions 5ª, and a central portion projected between and connected to the central portions of the impact bars or plates, as by means of suitable clamping plates 6 and bolts 6ª.

The parts 5 of the rear or auxiliary bar of the bumper shown in Fig. 1 provide convenient means for supporting the bumper from the arms 1 by means of my clamping devices, which will now be described.

Each device comprises a pair of symmetrical plates indicated at 7, each plate being generally triangular in shape and having a reduced or narrow rear or inner end 7ª and a widened front or outer end 7ᵇ, such widened end being provided with a flange 7ᶜ bent therefrom at substantially right angles to the body of the plate. The plates 7 may be, and preferably are, made identical, and the plates may be used as upper or lower plates, each having a channeled seat 7ᵈ for an edge of the bar or plate 5, opposite sides of the seat being formed by the inner wall of the flange 7ᶜ and by a short tapered wall 7ᵉ opposite such inner wall.

Each of the plates 7 is provided with a pair of annular seats 7ᶠ, located near the flanged edge thereof and each adapted to receive the head 8ª, or the lock washer 8ᵇ, of a bolt 8, the nut for such bolt being shown at 8ᶜ. The rear or inner ends of the plates constituting each clamp are pivotally connected to the appropriate eye 2 on the cooperating arm 1 by means of a bolt 9 extending through holes in the rear or inner end of each clamping plate, such rear or inner end also having an elevated annular seat 7ᵍ for the head 9ª, or the lock washer 9ᵇ, of such bolt 9.

The pivotal clamp provided by the plates 7 and the bolts 8 and 9 is very cheap of production; but it affords a most efficient means for supporting the bumper from the arms 1. The position of the bolts 8, immediately adjacent to, and preferably engaging, the rear or inner face of the plate 5, enables a non-rattling connection to be made between the clamping plates and the bumper bar or plate. Furthermore, this location of the bolts and the edgewise engagement of the clamping plates therewith enables me to obtain a most efficient clamping action, with the result that the bumper can be held very firmly and securely by the clamping plates to the ends of the arms 1.

In Fig. 4, there is shown a modification of the invention, wherein the clamping plates 10 are generally similar to the clamping plates 7, but are adapted for a narrower rear or inner bar or plate 5, but without any necessary reduction in the width of the supporting arms 1. In this form of my invention, the forward or outer ends of the plates are bent inwardly or toward each other, as indicated at 10ª so that the distance between the plate-engaging seats 10ᵇ is lessened, to accommodate the narrow plate or bar. The seats are similar in construction to the seats provided in the form of my invention previously described. The seats 10ᶜ for the heads and washers of the bolts 8 will preferably project beyond the inclined surfaces 10ª of the plates a sufficient distance to bring these seats substantially flush with the horizontal bodies of such plates.

Having thus described my invention, what I claim is:

1. The combination, with a supporting member having an eye, of means for clamping and pivotally supporting a bar or plate from said eye, said means comprising a pair of opposed plates each having a seat adapted to engage an edge of the bar or plate, a pair of bolts extending through the first mentioned plates and substantially contacting with the adjacent inner face of said bar or plate, and a bolt extending through said eye and the rear or inner ends of the said clamping plates.

2. The combination, with a supporting member having an eye, of means for clamping and pivotally supporting a bar or plate from said eye, said means comprising a pair of opposed symmetrical plates each having a flange adapted to engage the front or outer face of said bar or plate and a seat located inwardly or rearwardly from said flange, a pair of bolts extending through said plates at the rear of or inwardly from said seats and adapted to substantially engage the rear or inner face of the first mentioned bar or plate, and a bolt extending through the rear or inner ends of the clamping plates and through said eye.

3. The combination, with a supporting member having an eye, of means for clamping a bar or plate and for pivotally supporting it from said eye, said means comprising a pair of symmetrical clamping plates, each plate having at its front or outer end a flange adapted to overlap and engage the front or outer face of the bar or plate and a tapered wall opposed to and spaced inwardly from such flange to provide with the flange a seat for an edge of said bar or plate, a pair of bolts extending through said clamping plates adjacent to the rear or inner face of said bar or plate, and a bolt extending through the rear or inner ends of said clamping plates and through said eye.

4. The combination, with a supporting member having an eye, of means for clamping a bar or plate and for pivotally supporting it from said eye, said means comprising a pair of substantially triangular clamping plates each having its front or outer end widened and each provided with a seat for an edge of said bar or plate adjacent to such front or outer end, a pair of laterally spaced bolts extending through and connecting the said clamping plates adjacent to said bar or plate, and a bolt extending through said eye and the smaller end of each of the clamping plates.

5. The combination, with a supporting member, of means for clamping a bar or plate and for supporting it from said member, said means comprising a pair of substantially triangular clamping plates each having is front or outer end widened and each provided with a seat for an edge of said bar or plate adjacent to such front or outer end, laterally spaced bolts extending through and connecting the said clamping plates adjacent to said bar or plate, and means connecting the smaller end of each of the clamping plates to said member.

In testimony whereof, I hereunto affix my signature.

HERBERT S. JANDUS.